(12) United States Patent
Sohn

(10) Patent No.: US 6,538,428 B1
(45) Date of Patent: Mar. 25, 2003

(54) MEASURING METHOD FOR MECHATRONICS

(75) Inventor: Robert Sohn, Hannover (DE)

(73) Assignee: WABCO GmbH & Co. OHG, Hannover (DE)

(*) Notice: Subject to any disclaimer, the term of this patent is extended or adjusted under 35 U.S.C. 154(b) by 0 days.

(21) Appl. No.: 09/941,272

(22) Filed: Aug. 28, 2001

(30) Foreign Application Priority Data

Oct. 14, 2000 (DE) .......................... 100 51 048

(51) Int. Cl.[7] ............... G01B 7/14; G01B 7/30
(52) U.S. Cl. ............... 324/207.16; 324/207.24
(58) Field of Search .............. 324/207.16, 207.17, 324/207.19, 207.15, 207.23, 207.24, 654; 73/728; 336/110, 30

(56) References Cited

U.S. PATENT DOCUMENTS

| 4,339,955 A | | 7/1982 | Iwasaki |
| 4,649,341 A | | 3/1987 | Ulbrich et al. |
| 4,859,942 A | * | 8/1989 | Charton et al. ............. 324/208 |
| 5,148,107 A | * | 9/1992 | Finger et al. ........... 324/207.26 |
| 5,712,563 A | | 1/1998 | Kawagoe et al. |
| 5,994,895 A | * | 11/1999 | Bote et al. ............. 324/207.16 |

FOREIGN PATENT DOCUMENTS

| DE | 3133043 | 4/1982 |
| DE | 3343885 | 10/1984 |
| DE | 4118975 | 12/1992 |
| DE | 4443259 | 6/1995 |
| DE | 19612835 | 10/1997 |
| DE | 19624801 | 1/1998 |
| DE | 4313273 | 9/1998 |
| EP | 0126846 | 12/1984 |
| EP | 0207218 | 1/1987 |
| EP | 0945709 | 9/1999 |
| GB | 2290384 | 12/1995 |
| WO | 0071977 | 11/2000 |

* cited by examiner

Primary Examiner—Edward Lefkowitz
Assistant Examiner—S Zaveri
(74) Attorney, Agent, or Firm—Proskauer Rose LLP

(57) ABSTRACT

A measurement method for a mechatronics apparatus, which includes an electromagnetically actuated component, an electronic control circuit, and at least one sensor, is selectively timed to minimize electromagnetic interference between the electromagnetically actuated component and the sensor(s). This is accomplished by restricting a sensor measurement to a time window, during which time the electromagnetically actuated component either has no current flow, or has a current change magnitude that is lower than a predetermined limit.

9 Claims, 2 Drawing Sheets

MEASURING METHOD FOR MECHATRONICS

BACKGROUND OF THE INVENTION

The present invention relates to a measuring method for a mechatronics apparatus. More specifically, the present invention relates to a measuring method for an electromagnetic device and its associated sensor and electronic circuitry.

This type of mechatronics apparatus is disclosed in German patent document DE-A 100 22 124 (filed in the U.S. Patent Office under Ser. No. 09/841,549), which is incorporated herein by reference. The mechatronics apparatus includes an electronic control circuit and an electromechanical component, e.g., a solenoid valve, which are contained in a common housing made of a material such as aluminum. The electronic control circuit is made up of electronic components installed on a printed circuit board, which is located in a compartment of the mechatronics housing. The electronic components (resistances, capacitors, transistors, micro-controllers, etc.) are soldered to the printed circuit board in a conventional manner. In addition, one or more sensors are also typically included among the electronic components attached to the printed circuit board. These sensors are capable of measuring, e.g., distances, pressures, or temperatures.

An inductive distance sensor, consisting of a coil with a distance-dependent displaceable core, is disclosed in German patent document DE-A 33 43 885 (equivalent to U.S. Pat. No. 4,649,341, Mar. 10, 1997, by Ulbrich et al), which is incorporated herein by reference. The actual distance setting of the core is ascertained at discrete points in time by exciting the coil with a voltage impulse, and the resultant charging current is monitored. The inductivity at a particular point in time is then a measure of the core displacement distance. In this prior art arrangement, the coil is triggered by a microcontroller, and the charging time of the coil is converted by the same. microcontroller into the distance to be measured.

When making mechatronics measurements, however, which involve a magnetically actuated component, such as a solenoid valve, a relay or an operating magnet, there is a significant risk that an inductive sensor within the electronic control circuit may be affected by electromagnetic interference from the above-mentioned magnetically actuated component. As a result, electromagnetically induced interference voltages in the inductive sensor can degrade its measurement accuracy. In addition, interference or influence by electrical fields can cause similar problems.

Although it is known that inductive sensors can be shielded from electromagnetic interference, according to German patent document DE-A 196 24 801 (equivalent to U.S. Pat. No. 5,994,895, Nov. 30, 1999, by Bolte et al), which is incorporated herein by reference, such measures involve the added costs associated with shielding.

Accordingly, it is an object of the present invention to minimize the aforementioned type of electromagnetic interferences in mechatronics sensors, without incurring the added costs of shielding.

SUMMARY OF THE INVENTION

In accordance with an illustrative embodiment of the present invention, a measurement method for a mechatronics apparatus, having an electromagnetically actuated component, an electronic control circuit, and a sensor with a displaceable core, comprises the steps of:

a. at a measurement start time, applying a voltage impulse of a predetermined peak magnitude to the sensor,
   b. determining a measurement end time, when the voltage impulse magnitude has decreased to a predetermined level,
   c. calculating an inductivity of the sensor, based on the difference between the measurement start and end times, and
   d. calculating a position of the displaceable core, based on the calculated inductivity of the sensor, wherein the measurement start time and the measurement end time define the boundaries of a measurement time window, this time window being restricted to those times when the electromagnetically actuated component does not have a current flow, or when a current flow change in the electromagnetically actuated component is below a predetermined limit value.

Typically, the electromagnetically actuated component is a solenoid valve, and the sensor is an inductive distance sensor, or possibly an angle sensor. The solenoid valve is normally actuated through the application of a switching voltage, which is sufficient to hold it in an energized state. The switching voltage alternates between a maximum level for a switched-on time, and a minimum level for a switched-off time. The measurement time window is positioned such that the measurement start time occurs after a switching time of the switching voltage, and the measurement end time occurs before the next switching time of the switching voltage. In this manner, the measurement is not subjected to the electromagnetic interference that is generated by the high rate of current change in the solenoid valve, at the time of voltage switching.

BRIEF DESCRIPTION OF THE DRAWINGS

The invention is described in greater detail below through the example of embodiments shown in the drawings, wherein.

DETAILED DESCRIPTION OF PREFERRED EMBODIMENTS OF THE INVENTION

Figure 1:
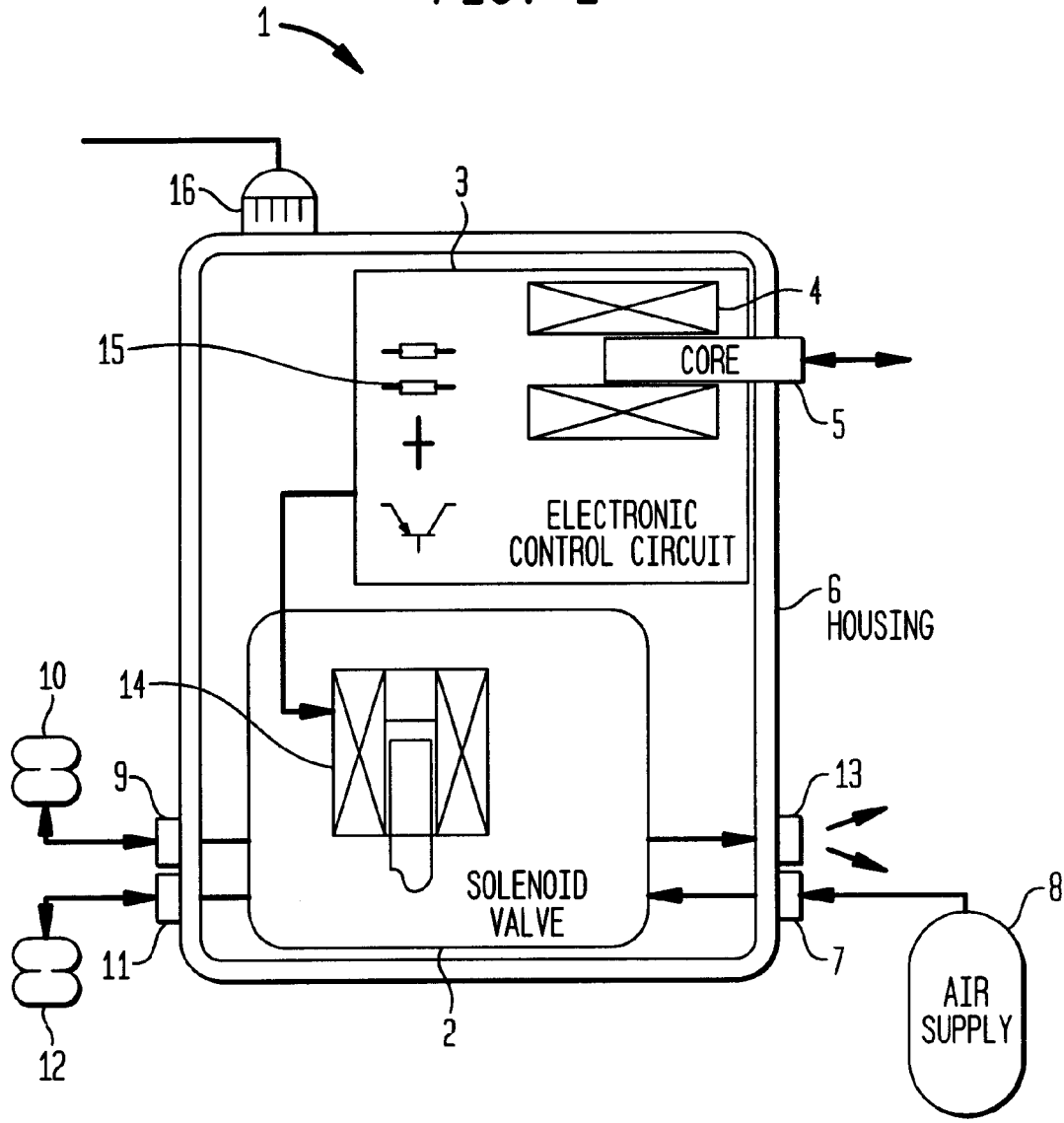
FIG. 1 shows a schematic representation of a mechatronics apparatus, including a solenoid valve, an electronic control circuit, and a distance sensor, all within a common housing, in accordance with the invention.

FIG. 1 shows a mechatronics apparatus 1, as previously defined herein, which contains both mechanical and electrical components, including a solenoid valve 2 and an electronic control circuit 3, in a common housing 6. In this embodiment, the mechatronics apparatus 1 is used to regulate the level of a motor vehicle. For this purpose, a compressed-air supply 8 is connected to a first compressed-air terminal 7. A first pneumatic spring 10 is connected to a second compressed-air terminal 9, and a second pneumatic spring 12 is connected to a third compressed-air terminal 11. The two pneumatic springs 10, 12, located between an axle and the body of the vehicle, are used for suspension, as well as for adjustment, in order to maintain the distance (level) between axle and body constant.

The solenoid valve 2 can vent compressed air to the outside via a fourth compressed-air terminal 13, when necessary.

The solenoid valve 2 contains one or more magnet coils 14, by means of which one or more valve closing elements (not shown) can be actuated.

The electronic control circuit 3 contains electronic components 15, such as resistances, capacitors or microcontrollers. In addition, the electronic control circuit 3 contains one or more distance sensors 4, 5, by means of which, e.g., the distance between the vehicle axle and body can be measured.

The distance sensor 4, 5 is constructed as a conventional inductive distance sensor, having a coil 4, and a core 5 displaceable within the coil 4.

The mechatronics apparatus 1 is also equipped with an electrical terminal 16, for connection to an operating voltage supply (not shown) for the electronic control circuit 3 and the solenoid valve 2, and also to any requisite control commands.

Figure 2A:
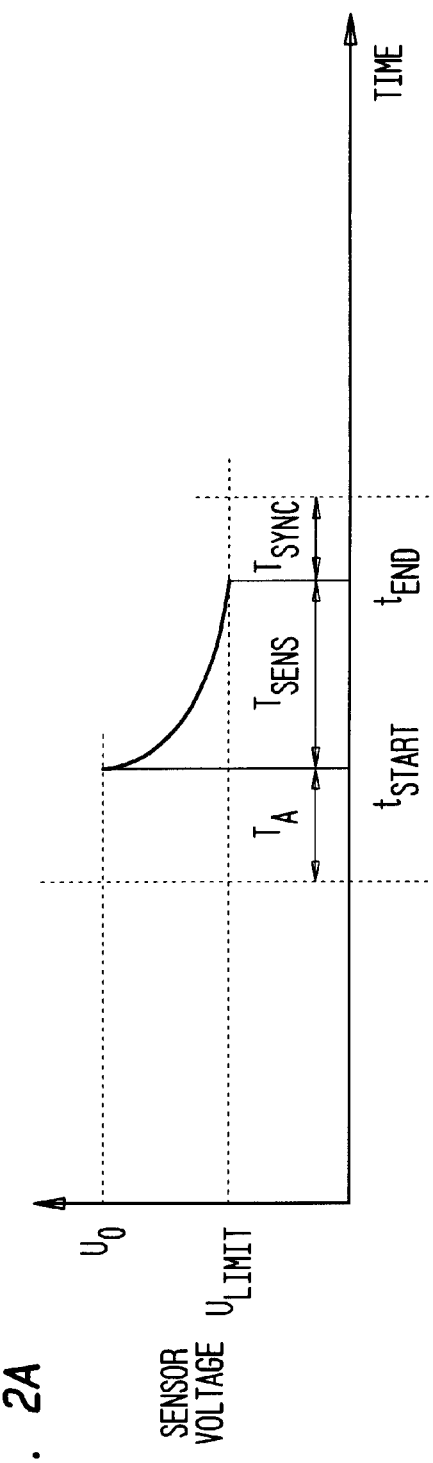
FIG. 2a shows a timing diagram of sensor voltage versus time, in accordance with the invention.

The electrical evaluation of the distance sensor 4, 5, i.e., the measuring process, takes place at discrete points in time, as depicted in FIG. 2a. At a desired point in time $t_{start}$, a voltage with a value $U_o$ is switched on by a microcontroller within electronic control circuit 3, and is impressed via a resistor across the inductive coil 4 of the sensor 4, 5. After a time $T_{sens}$, at a point in time $t_{end}$, the coil 4 voltage has dropped to a predetermined limit value $U_{limit}$. The time $T_{sens}$ is measured by the microcontroller within electronic control circuit 3, which also converts this time measurement into a displacement distance of the sensor core 5. As such, the time $T_{sens}$, and thereby the inductivity of the coil 4, is a measure of the displacement distance of the core 5. A typical value for $T_{sens}$ is 500 to 600 µs.

Figure 2B:
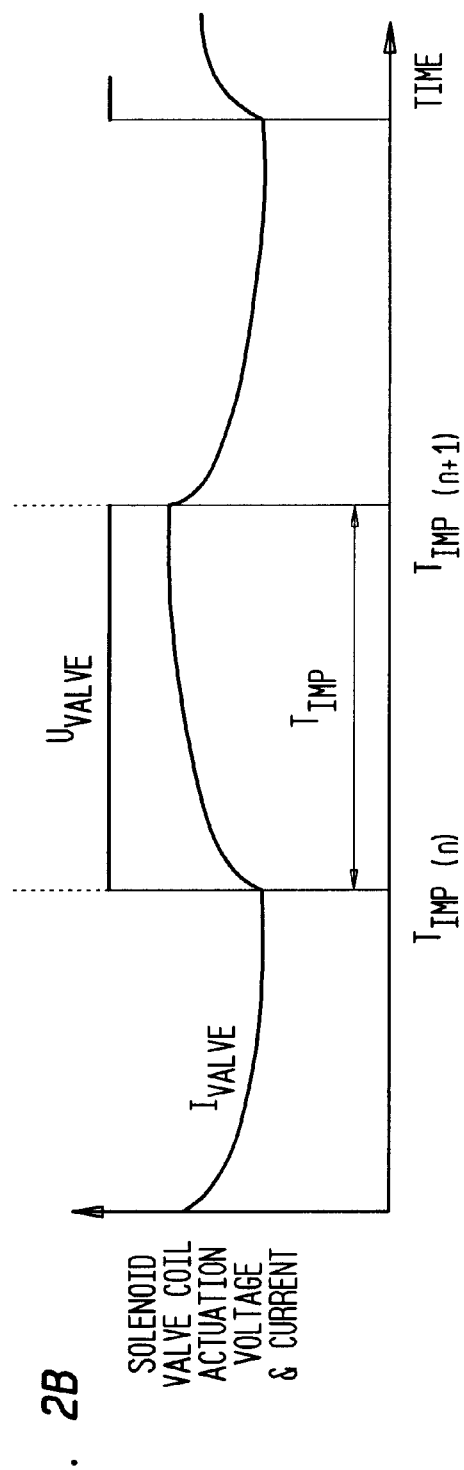
FIG. 2b shows a timing diagram of solenoid valve coil actuation versus time, in accordance with the invention.

FIG. 2b depicts the actuation characteristics of the solenoid valve coil 14 over time. The coil 4 is actuated by a switch regulator (two-point regulator), which generates a rectangular voltage waveform having a peak value of $U_{valve}$, a minimum value of zero, and a time interval of $T_{imp}$. In FIG. 2b, this voltage waveform is shown at a maximum between $t_{imp(n)}$ and $t_{imp(n+1)}$. The period of the switching frequency is approximately 2.5 ms, corresponding to 400 Hz. The intervals $U=U_{valve}$ and $U=0$ are shown as approximately equal lengths in FIG. 2b, but may also be of different durations.

The resultant current ($I_{valve}$) in coil 4 rises exponentially in the switched-on phases and falls exponentially in the switched-off phases. This current. ($I_{valve}$) attains a median value that is sufficient to hold the actuated valve element in an energized state against the force of a spring (not shown). To switch off the solenoid valve 14, the voltage U is set to zero.

Although the axes of the coils 4 and 14 are positioned at right angles to each other to reduce electromagnetic interference, as shown in FIG. 1, tests have demonstrated that the coil 4 of the distance sensor 4, 5 can nevertheless be disturbed by electromagnetic influences from the coil 14 of the solenoid valve 2. This disturbance is at a maximum when the current $I_{valve}$ in the coil 14 reaches its peak value at point in time $t_{imp(n+1)}$, as shown in FIG. 2b. The disturbance is also great when the solenoid valve 2 (FIG. 1) is switched on or off at points in time $t_{imp(n)}$ and $t_{imp(n+1)}$. Especially great disturbances occur when the valve 2 is fully switched on or off (not shown).

In order to minimize the above-described electromagnetic interferences between the magnet coil 14 and the sensor 4, 5, the measurement of the sensor 4, 5 is carried out only during a restricted time interval. This interval is shown in FIG. 2a as the time window $T_{sens}$, during which time the solenoid valve 2 current is not being switched. By this measure the time interval is selected such that a change in the solenoid valve 2 current lays below a predetermined limit value. Alternatively, the measurement is carried out only at times when the solenoid valve is not in operation (not shown), and therefore has no current flow.

By conducting sensor measurements in this time-restricted manner, the measuring process is limited to time segments in which the level of electromagnetic interference between the coils 14 and 4 is particularly low, because of the limited level of current change in the coil 14 during the measurement period.

The starting time $t_{start}$ of the time measurement period is advantageously determined in such manner that the ending time $t_{end}$ of the time measurement period precedes the switch-over time $t_{imp(n+1)}$ of the solenoid valve 2 by a predetermined time segment $T_{sync}$ (synchronization time). The time segment $T_{Sync}$ is predetermined in such manner that a sufficient safety interval remains before the next switch-over time $t_{imp(n+1)}$ of the solenoid valve coil 14. A typical value for the time segment $T_{sync}$ is 400 µs.

In order to maintain an optimum measurement time segment, a distance $T_A$, between switch-over time $t_{imp(n)}$ and starting time $t_{start}$ is calculated according to the formula:

$$T_A = T_{imp} - T_{sync} - T_{sens} \qquad [\text{Equation 1}]$$

where $T_{imp}$=Switch-on phase of the solenoid valve 2;
$T_{sync}$=Synchronization time; and
$T_{sens}$=Sensor running time of the previous measurement.

To implement Equation 1, it is necessary to store the measured sensor running times $T_{sens}$ in the electronic control circuit 3, e.g., in a microcontroller, so that the sensor running time of the previous measurement is available for calculating $T_A$.

Since the points in time $t_{imp(n)}$ and $t_{imp(n+1)}$ can easily be measured, e.g., by monitoring the current $I_{valve}$, the microcontroller is able to start the measurement with a time delay $T_A$ after the point in time $t_{imp(n)}$.

Finally, it is also advantageous that during the actuation phases of the solenoid valve 2, i.e., between points in time $t_{imp(n)}$ and $t_{imp(n+1)}$, (FIG. 2b), no temperature compensation measurements and calculations are carried out for sensor 4, 5. For this, a steady state of the sensor 4, 5 should be used.

In short, a measuring method for a mechatronics apparatus is disclosed which minimizes the electromagnetic interference between a pulsed solenoid valve coil and an associated sensor coil within the same mechatronics housing. The inventive measurement method is timed selectively, so that the current changes in the solenoid valve coil are below a predetermined level during the time of the measurement.

What is claimed is:

1. A measurement method for a mechatronics apparatus, having at least one electromagnetically actuated component, an electronic control circuit, and at least one sensor comprising starting a measurement at a measurement start time and ending the measurement at a measurement end time, wherein the measurement start time and the measurement end time define the boundaries of a measurement time window, said measurement time window being restricted to those times when said electromagnetically actuated component does not have a current flow, or when a current flow change in said electromagnetically actuated component is below a predetermined limit value.

2. The measurement method of claim 1, wherein said electromagnetically actuated component is a solenoid valve.

3. The measurement method of claim 1, wherein said sensor is an inductive distance sensor.

4. The measurement method of claim 1, wherein said sensor is an inductive angle sensor.

5. The measurement method of claim 1, further comprising the steps of applying a switching voltage to said electromagnetically actuated component sufficient to hold it in an energized state, said switching voltage alternating between a maximum level for a switched-on time, and a minimum level for a switched-off time, positioning said measurement time window such that said measurement start time occurs a time $T_A$ after a switching time of said switching voltage, and said measurement end time occurs a synchronization time $T_{sync}$ before the next switching time of said switching voltage.

6. The measurement method of claim 5, wherein said time $T_A$ is calculated according to the formula:

$$T_A = T_{imp} - T_{sync} - T_{sens}$$

where $T_{imp}$=said switched-on time of said electromagnetically actuated component, $T_{sync}$=synchronization time, and $T_{sens}$=said measurement time window of an immediately preceding measurement.

7. The measurement method of claim 6, wherein a temperature compensation measurement for said sensor is prohibited during said switched-on time of said electromagnetically actuated component.

8. The measurement method of claim 7, wherein a temperature compensation calculation for said sensor is prohibited during said switched-on time of said electromagnetically actuated component.

9. A measurement method for a mechatronics apparatus, having at least one electromagnetically actuated component, an electronic control circuit, and at least one sensor in proximity to said electromagnetically actuated component, wherein a measurement by said sensor is affected by an electromagnetic field of said electromagnetically actuated component, comprising starting a measurement by said sensor at a measurement start time and ending the measurement at a measurement end time, wherein the measurement start time and the measurement end time define the boundaries of a measurement time window, said measurement time window being restricted to those times when said electromagnetically actuated component does not have a current flow, or when a current flow change in said electromagnetically actuated component is below a predetermined limit value, thereby to reduce the effect of the electromagnetic field of said electromagnetically actuated component on said measurements.

* * * * *